(12) United States Patent
Blythe et al.

(10) Patent No.: US 10,961,902 B2
(45) Date of Patent: Mar. 30, 2021

(54) TURBINE-COMPRESSOR ASSEMBLY AND METHOD

(71) Applicant: Transportation IP Holdings, LLC, Norwalk, CT (US)

(72) Inventors: Neil Xavier Blythe, Erie, PA (US); Pradheepram Ottikkutti, Lawrence Park, PA (US); Rogier Giepman, Garching (DE); Michael Majewski, Erie, PA (US); Kevin McElhaney, Erie, PA (US); Najeeb Kuzhiyil, McKinney, TX (US)

(73) Assignee: TRANSPORTATION IP HOLDINGS LLC, Norwalk, CT (US)

( * ) Notice: Subject to any disclaimer, the term of this patent is extended or adjusted under 35 U.S.C. 154(b) by 0 days.

(21) Appl. No.: 16/713,266

(22) Filed: Dec. 13, 2019

(65) Prior Publication Data

US 2020/0256243 A1 Aug. 13, 2020

Related U.S. Application Data

(60) Provisional application No. 62/804,935, filed on Feb. 13, 2019.

(51) Int. Cl.
| | |
|---|---|
| *F02B 37/14* | (2006.01) |
| *F02G 5/02* | (2006.01) |
| *F02B 39/10* | (2006.01) |
| *F02B 37/02* | (2006.01) |
| *F01N 5/04* | (2006.01) |

(52) U.S. Cl.
CPC ............... *F02B 37/14* (2013.01); *F01N 5/04* (2013.01); *F02B 37/02* (2013.01); *F02B 39/10* (2013.01); *F02G 5/02* (2013.01)

(58) Field of Classification Search
CPC .......... F02B 37/14; F02B 39/10; F02B 37/02; F02G 5/02; F01N 5/04
USPC ................................................. 60/605.1–612
See application file for complete search history.

(56) References Cited

U.S. PATENT DOCUMENTS

| | | | |
|---|---|---|---|
| 6,378,307 B1 * | 4/2002 | Fledersbacher | ......... F02B 37/24 60/605.2 |
| 7,870,731 B2 * | 1/2011 | Fledersbacher | ..... F04D 29/4213 60/605.1 |
| 8,813,494 B2 | 8/2014 | Hofer | |
| 9,581,095 B2 * | 2/2017 | Pursifull | .......... F02M 35/10222 |

(Continued)

*Primary Examiner* — Hoang M Nguyen
(74) *Attorney, Agent, or Firm* — Mary D. Lawlor; The Small Patent Law Group LLC

(57) ABSTRACT

A method and a turbine-compressor assembly of a system having an engine includes an upstream valve coupled with a compressor and a turbine-compressor device, a downstream valve coupled with a turbine and the device, and a controller to control the upstream, downstream, and a control valve. The controller selectively operates the device in a plurality of operating modes. In a turbine mode of operation, the upstream valve directs inlet air to the compressor, the turbine receives engine exhaust, the downstream valve directs first turbine exhaust from the turbine to the device, and the control valve directs second turbine exhaust from the device to an outlet. In a compressor mode of operation, the control valve directs the inlet air to the device, the upstream valve directs first compressed air from the device to the compressor, and the downstream valve directs the first turbine exhaust from the turbine to the outlet.

20 Claims, 6 Drawing Sheets

(56) References Cited

U.S. PATENT DOCUMENTS 10,337,347 B2 7/2019 Mischler
2010/0089056 A1 4/2010 Cooper \* cited by examiner

TURBINE-COMPRESSOR ASSEMBLY AND METHOD

CROSS-REFERENCE TO RELATED APPLICATIONS

This application claims priority to U.S. Provisional Application No. 62/804,935, which was filed on 13 Feb. 2019, the entire disclosure of which is incorporated herein by reference.

BACKGROUND

Technical Field

Embodiments of the subject matter described herein relate to controlling operation of a powered system, such as a vehicle system.

Discussion of Art

Turbochargers can increase power output of a reciprocating engine by increasing the pressure and flow rate of intake air to burn more fuel efficiently within constraints of regulated emission levels. The compressor of a turbocharger is driven by the turbine using energy extracted from exhaust gases of the engine. The compressor is mechanically coupled to the turbine via a solid shaft or a clutch drive or system. Vehicles systems or other powered systems can include turbocharged engine systems that include radial turbines attached to an electric generator. The generator extracts energy from exhaust gases of the reciprocating engine system that would otherwise be wasted with exhaust gases vented out of the powered system. However, turbochargers are limited in the amount of energy extracted due to mechanical and thermal limitations of both the turbine and the compressor.

As one alternative, additional energy may be extracted from the exhaust gas by adding a second turbine downstream from the first turbine. The second stage turbine may be used to drive the first stage compressor, and the first stage turbine may be used to drive the second stage compressor. As another alternative, the downstream turbine may be used to drive an electrical generator that feeds electrical power into an electrical power plant, into an energy storage device, to feed supplemental power to traction motors, or the like. However, the single stage and double stage turbochargers have limited benefit at low engine loads and low engine speeds where the amount of available exhaust energy is reduced. It may be desirable to have a system and method that differs from those that are currently available.

SUMMARY

In at least one embodiment, a turbine-compressor assembly of a system having an engine includes an upstream valve fluidly coupled with both a compressor and a turbine-compressor device, a downstream valve fluidly coupled with a turbine and the turbine-compressor device, and a controller configured to control the upstream valve, the downstream valve, and a control valve that is coupled with the upstream valve, the downstream valve, and the turbine-compressor device. The controller being further configured to selectively operate the turbine-compressor device in a plurality of operating modes In a turbine mode of operation, the upstream valve is controlled to direct inlet air to the compressor, the turbine is controlled to receive engine exhaust, the downstream valve is controlled to direct first turbine exhaust from the turbine to the turbine-compressor device, and the control valve is controlled to direct second turbine exhaust from the turbine-compressor device to an outlet of the system. In a compressor mode of operation, the control valve is controlled to direct the inlet air to the turbine-compressor device, the upstream valve is controlled to direct first compressed air from the turbine-compressor device to the compressor, and the downstream valve is controlled to direct the first turbine exhaust from the turbine to the outlet of the system.

In at least one embodiment, a method includes switching between operating a turbine-compressor assembly of a system at least in a turbine mode of operation and a compressor mode of operation. In the turbine mode of operation, directing inlet air to a compressor, receiving engine exhaust at a turbine, directing first turbine exhaust from the turbine to a turbine-compressor device, and directing second turbine exhaust from the turbine-compressor device to an outlet of the system. In the compressor mode of operation, directing the inlet air to the turbine-compressor device, directing first compressed air from the turbine-compressor device to the compressor, and directing the first turbine exhaust from the turbine to the outlet of the system.

In at least one embodiment, a turbine-compressor assembly of a vehicle system having an engine includes a valving system coupled with a compressor, a turbine, and a turbine-compressor device, a power device coupled with the turbine-compressor device, and a controller configured to control the valving system to selectively switch between two or more operating modes of the turbine-compressor device. In a turbine mode of operation, the valve system is configured to direct inlet air to the compressor, the turbine being configured to receive engine exhaust, direct first turbine exhaust from the turbine to the turbine-compressor device, direct second turbine exhaust from the turbine-compressor device to an outlet of the vehicle system, and generate electrical power for the power device. In a compressor mode of operation, the valve system is configured to direct the inlet air to the turbine-compressor device, direct first compressed air from the turbine-compressor device to the compressor, direct the first turbine exhaust from the turbine to the outlet of the vehicle system, and consume electrical power of the power device to compress the inlet air by the turbine-compressor device.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
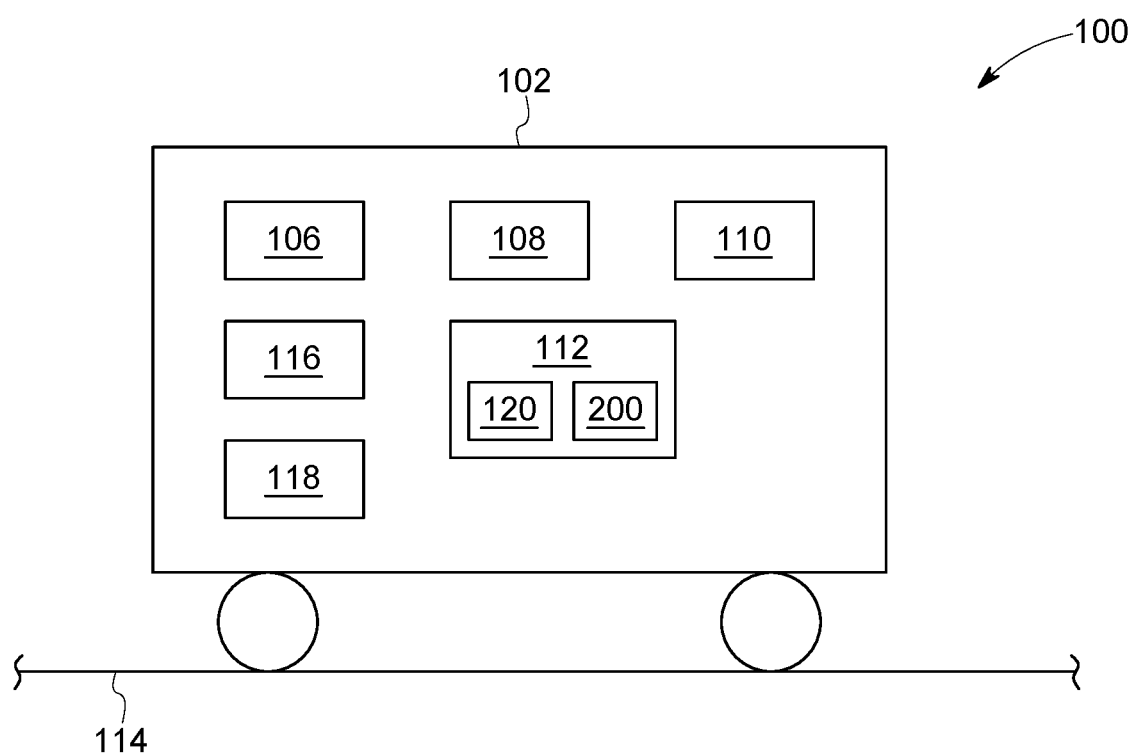
FIG. 1 illustrates one embodiment of a vehicle system.

One or more embodiments of the inventive subject matter described herein provide systems and methods for operating a hybrid turbine-compressor assembly of a vehicle system, including one or more rail vehicles and/or locomotives. Vehicle systems or other powered systems can include turbo engine systems that include radial turbines attached to a generator to extract energy from exhaust gases of the turbo engine system that would otherwise be wasted with exhaust gases vented out of the rail vehicle. While some embodiments described herein relate to rail vehicle systems, not all embodiments of the inventive subject matter are restricted to rail vehicle systems or rail vehicles. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. Additionally, the vehicle systems may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel. Optionally, one or more embodiments may be used in connection with turbine-compressor assemblies for stationary power-generating systems.

A hybrid turbine-compressor assembly including a hybrid turbine-compressor device may be used to increase the utilization of the exhaust turbine generator and facilitate increased air pressure at reduced loads or transient conditions. At increased loads, exhaust energy may drive the hybrid turbine-compressor device in a first direction, thereby operating the hybrid device as a hybrid turbine. At increased loads, the hybrid turbine-compressor assembly operates in a turbine mode of operation. At reduced loads or transient conditions, the electrical power from the generator may be reversed and used to drive the hybrid turbine-compressor device in an opposite direction, thereby operating the hybrid device as a hybrid compressor. At the reduced loads, the hybrid turbine-compressor assembly operates in a compressor mode of operation.

In controlling the direction of electrical power from the generator, the rail vehicle system can control one or more valves of the hybrid turbine-compressor assembly to change the direction of flow of fluids (e.g., inlet air, compressed air, engine exhaust, turbine exhaust, or the like) based on the hybrid turbine-compressor assembly operating in the turbine mode or compressor mode of operation.

One or more embodiments of the inventive subject matter described herein provide a hybrid turbine-compressor assembly of a system that includes an upstream valve, a downstream valve, and a control valve fluidly coupled between a turbine, a compressor, and a hybrid turbine-compressor device. The hybrid turbine-compressor assembly may operate in a turbine mode of operation or in a compressor mode of operation. While operating in the turbine mode of operation, the upstream valve directs inlet air to the compressor, the turbine receives engine exhaust, the downstream valve directs first turbine exhaust from the turbine to the hybrid turbine-compressor device, and the control valve directs second turbine exhaust from the hybrid turbine-compressor device to an outlet of the system.

While operating in the compressor mode of operation, the control valve directs the inlet air to the hybrid turbine-compressor device, the upstream valve directs compressed first compressed air from the hybrid turbine-compressor device to the compressor, and the downstream valve directs the first turbine exhaust from the turbine to the outlet of the system. As described herein, the hybrid turbine-compressor assembly can increase the amount of compressed air pressure provided to the engine responsive to the system operating at reduced loads or transient conditions and the hybrid turbine-compressor assembly is operating in the compressor mode of operation, can increase the efficiency of the engine, and can reduce the amount of emissions expelled from the vehicle system.

The vehicle system described herein can be formed from a single vehicle or from two or more vehicles (propulsion-generating vehicles and/or non-propulsion generating vehicles) traveling together as a consist. With respect to two or more vehicles, they may be mechanically coupled with each other, such as by couplers, or may be separate from each other but communicate with each other so that they can coordinate the respective movements to travel together as a system. Suitable vehicles may be rail vehicles (e.g., locomotives, shunters, switchers, and/or rail cars). Other suitable vehicles may be automobiles, trucks, buses, mining vehicles, industrial equipment, marine vessels, aircraft, or the like. Alternatively, the inventive system may be useful in a stationary powered system. For example, the powered system may be a power plant, or the like. The duty cycle and demands on a vehicle differ from those placed on a stationary application.

FIG. 1 illustrates one embodiment of a vehicle system 100. The vehicle system may also be referred to herein as a powered system. The vehicle system 100 is shown and described as a single rail vehicle 102 that travels along a route 114 In the illustrated embodiment, the vehicle is a locomotive that may move or travel along a track. Other suitable vehicles may include mining equipment, marine vessels, on-road trucks and cars, industrial and construction equipment, manned and unmanned aerial vehicles, or the like. In other embodiments, rather than a vehicle the inventive system may be deployed in a stationary powered system that may be powered by a turbine engine system. Different devices onboard and/or off-board the vehicle 102 may communicate with and/or among each other to control operations of the vehicle system. Optionally, the devices onboard the vehicle may also communicate with other devices off-board the vehicle.

The vehicle may include a brake system 108 that slows or stops movement of the vehicle. The brake system may represent air brakes, friction brakes, regenerative brakes (e.g., that include one or more traction motors of a propulsion system 112 of the vehicle), or the like. In one embodiment, the brake system may include a pressure vessel as part of the air brake system. In another embodiment, the brake system may include a jake brake or engine retarder. If such a retarder is present, a controller 110 may communicate with and/or control the retarder of the engine system responsive to its use. Optionally, one or more components, sensors, systems, or the like, that may be disposed onboard the vehicle 102 or may be disposed or deployed among plural different vehicles of the vehicle system.

The vehicle controller 110 represents hardware circuitry that includes and/or is connected with one or more processors (e.g., one or more microprocessors, field programmable gate arrays, integrated circuits, or the like) that operate to control movement of the vehicle. The controller may receive input from an operator onboard and/or off-board the vehicle, onboard a different vehicle of the vehicle system, or off-board the vehicle system via one or more input and/or output devices 116 and, based on the input, change the propulsion force or effort (e.g., torque, power, output, tractive effort, or the like) generated by the propulsion system 112 and/or may change the braking force or effort generated by the brake system. The input and/or output devices can be touchscreens, display devices, keyboards, pedals, levers, switches, buttons, microphones, speakers, or the like, that receive information from an operator and/or provide information to the operator onboard the vehicle.

The vehicle is propelled by the propulsion system 112 that represents one or more engines, alternators, generators, traction motors, gear boxes (e.g., holding gears that translate rotary motion created by an engine or motor into rotary motion of the wheels and/or axles of the vehicle). The propulsion system may be supplied with fuel from a fuel source 118, such as a tank of fuel. The propulsion system includes a turbine-compressor assembly 200.

The propulsion system may include one or more sensors 120. These sensors may measure one or more parameters of the propulsion system and/or of the vehicle. For example, a suitable sensor may measure the speed at which one or more wheels of the vehicle is moving, may be a location sensor that includes a global positioning system (GPS) receiver, wireless transceiving equipment (e.g., that triangulates locations of the vehicle), or the like. The sensors may measure one or more operating parameters of the turbine-compressor assembly 200, such as air-to-fuel ratios, exhaust temperatures, engine loads, the rate of fuel flow, engine speed, emissions rates, fuel consumption, or the like. As noted above, one or more sensors may be a location sensor that determines a location of the vehicle. The sensors may measure the one or more parameters at scheduled times or locations, continuously, randomly, at patterned intervals, or the like, as the vehicle moves along the route. Other suitable sensors may be weather sensors (e.g., thermometers, barometers, hygrometers, rain gauges, or the like), air quality measuring devices, or the like.

In one or more embodiments, the vehicle system may communicate with a controller or a back-office server such as an off-board database (not shown) off-board the vehicle system. One or more functions or operations of the vehicle system may be controlled by the back-office server instead of by an operator on-board the vehicle system, or by one or more processors onboard the vehicle system. The off-board database may represent the back-office server of a positive train control system. Alternatively, the off-board database may represent another computerized system that communicates with vehicle systems or powered systems described herein. As one example, the back-office server may communicate with the vehicle system and other powered systems traveling within an area associated with the back-office server. The back-office server can monitor the status of routes and/or vehicle systems in the associated area and communicate signals to the vehicle systems that prevent the vehicle systems from entering into identified segments of routes and/or allow the vehicle systems to enter into the identified segments of the routes. The back-office server can represent hardware circuitry that includes and/or is connected with one or more processors and transceiving hardware (e.g., a communication device as described herein).

Figure 2:
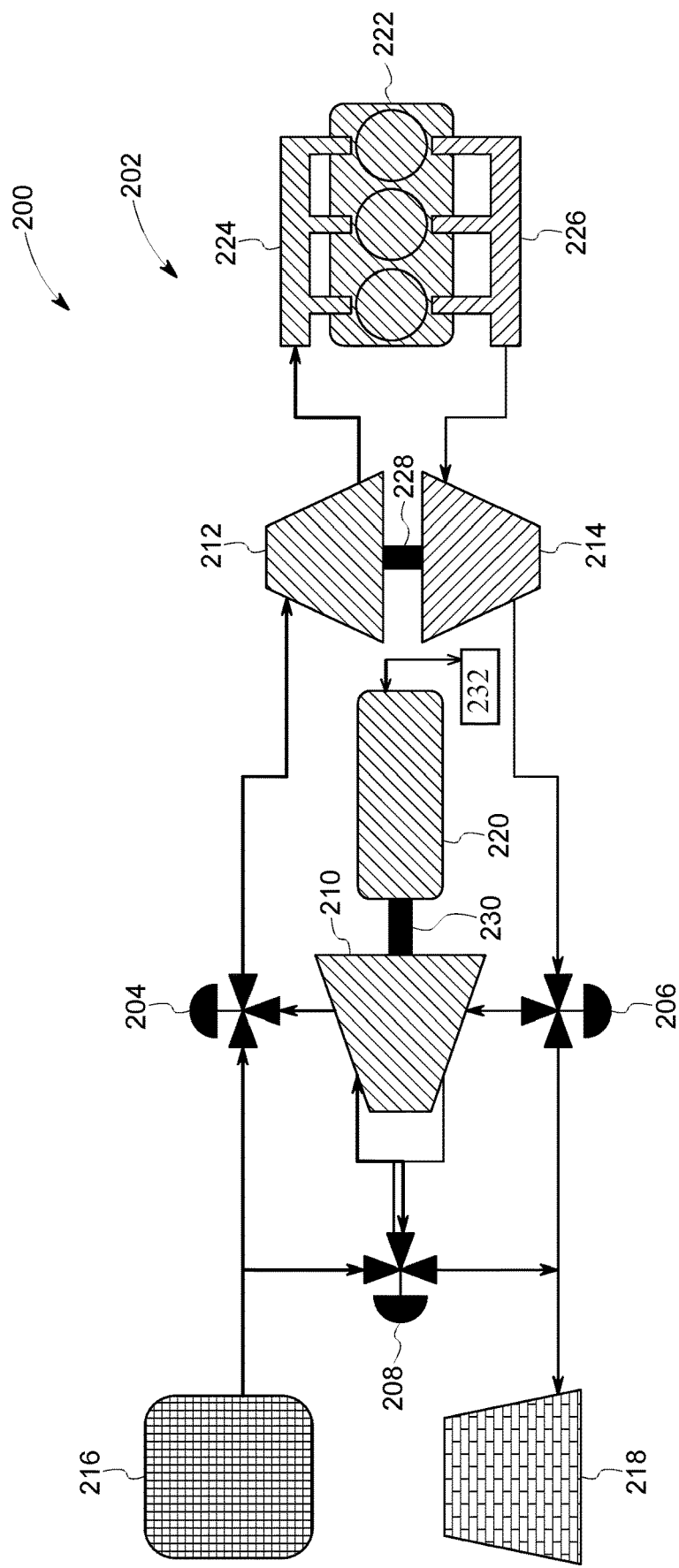
FIG. 2 illustrates one embodiment of a hybrid turbine-compressor assembly.

FIG. 2 illustrates one embodiment of the turbine-compressor assembly 200. The turbine-compressor assembly includes a turbocharger reciprocating engine system 202. The turbocharged reciprocating engine system includes a turbine 214 that is operably coupled with a compressor 212 by a shaft 228 such that the turbine provides torque to turn the compressor. In the illustrated embodiment, the compressor is a radial compressor and the turbine is a radial exhaust turbine. Optionally, the compressor may be an axial compressor, may be a plural stage axial and/or radial compressor, or the like, and the turbine may be an axial turbine or the like. The compressor and the turbine are coupled with an engine 222 via an air inlet manifold 224 and an exhaust gas outlet manifold 226, respectively. Compressed air may be directed from the compressor to the engine via the inlet manifold. Engine exhaust is directed from the engine to the turbine via the outlet manifold.

In the illustrated embodiment, the engine system includes only a single stage turbocharger including the compressor and the turbine. Additionally or alternatively, the engine system may include a second turbine (e.g., a second stage turbine) operably coupled with a second compressor (e.g., a first stage compressor, not shown). For example, the second stage turbine may drive the first stage compressor, and the first stage turbine may drive the second stage compressor. In another example, a second stage turbine may drive a second stage compressor and a first stage turbine may drive the first stage compressor. The turbine-compressor assembly includes an inlet 216 that directs air into the assembly and an outlet 218 that directs engine exhaust out of the assembly. In alternative embodiments, the outlet may be a pressure tank, or the like, that may receive engine exhaust from the assembly that may be recycled into the braking system, the propulsion system, an alternative compressed air system, or the like.

The turbine-compressor assembly includes a turbine-compressor device 210 that is fluidly coupled with the compressor and the turbine. The turbine-compressor assembly may operate in either a turbine mode of operation or in a compressor mode of operation. For example, the turbine-compressor device may be operably coupled with one or more processors of the vehicle system (of FIG. 1) via a switch. The one or more processors may change the position of the switch to direct the turbine-compressor device to operate as a hybrid turbine (e.g., in the turbine mode of operation) or as a hybrid compressor (e.g., in the compressor mode of operation) by changing the direction of rotation of a single turbine/compressor wheel or fan (not shown) of the hybrid turbine-compressor device. For example, the hybrid turbine-compressor device includes a single wheel that may be used alternatively as a turbine or as a compressor, as opposed to having separate turbine and compressor wheels. The turbine-compressor assembly may also be referred to as a hybrid turbine-compressor assembly having a hybrid turbine-compressor device that may operate as a turbine or operate as a compressor. For example, while the turbine-compressor assembly operates in the turbine mode of operation, the turbine-compressor device operates as the hybrid turbine. Alternatively, while the turbine-compressor assembly operates in the compressor mode of operation, the turbine-compressor device operates as the hybrid compressor. The controller can selectively switch the operating modes based at least in part on various input parameters.

The turbine-compressor device is manufactured from one or more materials that may be suitable for using the turbine-compressor device as the hybrid turbine or as the hybrid compressor. Suitable materials for producing the turbine-compressor device may include one or more metals, metallic alloys, ceramics, metal-ceramic composites, cermets, plastics, or the like. These materials may be selected based at least in part on their suitability for the increased operating temperatures while the turbine-compressor device operates in the turbine mode of operation and that may be suitable for the decreased operating temperatures while the turbine-compressor device operates in the compressor mode of operation. For example, while the turbine-compressor assembly operates in the turbine mode of operation, the operating temperature of the hybrid turbine is greater than the operating temperature of the hybrid compressor operating in the compressor mode of operation. The turbine-compressor device may be manufactured using materials that may be able to sustain a range of temperatures that the turbine-compressor device may experience while operating as the hybrid turbine and operating as the hybrid compressor.

The turbine-compressor device is coupled with an electrically powered motor-generator power device 220 via a shaft 230. The power device may operate in a generator mode of operation or in a motor mode of operation. The power device operates in the generator mode of operation while the turbine-compressor assembly operates in the turbine mode of operation. For example, while the power device operates in the generator mode of operation, the turbine-compressor device, operating in the turbine mode of operation, generates power for the power device which can be utilized to operate or run the turbine-compressor device. The generated power may be used as supplemental power to traction motors, may be stored via an energy storage system (e.g., such as an electricity storage device 232, which may represent a battery that is localized and integrated with the vehicle system), may feed into an electrical power plant or an energy storage device, or the like. Stored electric power can be used as needed to power the power device and to operate the power device in the motor mode and drive the power device in the compressor mode. Alternatively, the power device operates in the motor mode of operation while the turbine-compressor assembly operates in the compressor mode of operation. For example, while the power device operates in the motor mode of operation, the turbine-compressor device, operating in the compressor mode of operation, consumes power from the power device. The power device operates as a motor to provide power to the turbine-compressor device operating in the compressor mode of operation.

The turbine-compressor assembly includes a valve system that may include an upstream valve 204, a downstream valve 206, and a control valve 208 that control the flow of the fluids within the assembly. The upstream valve is fluidly coupled with the inlet 216, the compressor 212, and the turbine-compressor device. The downstream valve is fluidly coupled with the outlet 218, the turbine 214, and the turbine-compressor device 210. The control valve is fluidly coupled with the upstream valve, the downstream valve, and the turbine-compressor device. The upstream valve, the downstream valve, and the control valve are operably coupled with the one or more processors of the vehicle system via plural switches. The one or more processors may change the position of each of the switches of the upstream valve, the downstream valve, and the control valve 218 to change the flow of the fluid within the turbine-compressor assembly based on the turbine-compressor device operating in the turbine mode of operation or the compressor mode of operation.

The fluids (e.g., inlet air, compressed air, engine exhaust, turbine exhaust, or the like) move along different paths within the hybrid turbine-compressor assembly while the turbine-compressor device is operating in the turbine mode of operation or operating in the compressor mode of operation. The upstream valve, the downstream valve, and the control valve control the direction of flow of the fluids within the turbine-compressor assembly.

Figure 3:
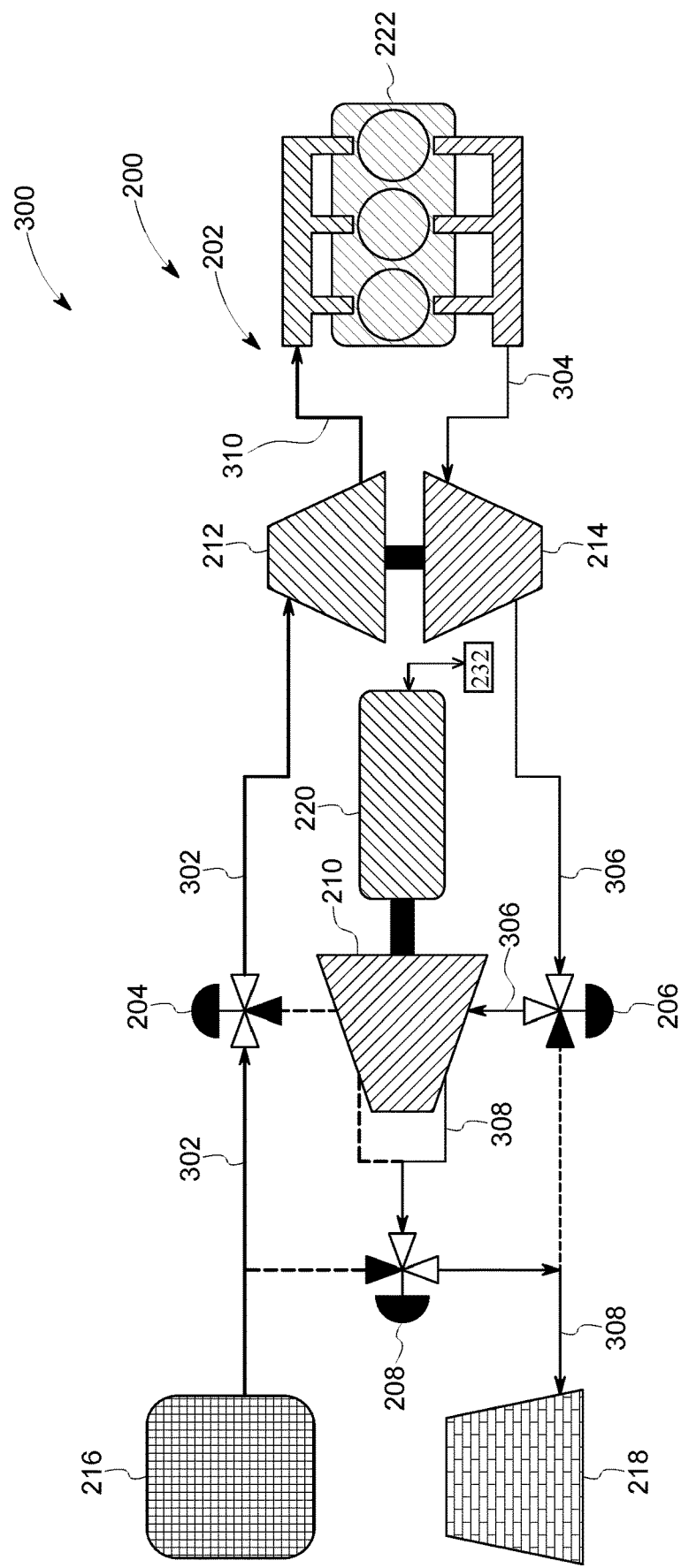
FIG. 3 illustrates one embodiment of the hybrid turbine-compressor assembly shown in FIG. 2 operating in a turbine mode of operation.

FIG. 3 illustrates one embodiment of the turbine-compressor assembly operating in the turbine mode of operation 300. While the turbine-compressor assembly operates in the turbine mode of operation 300, the turbine-compressor device operates as the hybrid turbine and the power device operates in the generator mode of operation, sending the generated electricity to the storage device 232 or to other power consuming devices.

Inlet air 302 is directed from the inlet to the upstream valve. The upstream valve directs the inlet air from the inlet to the compressor. The compressor compresses the air and directs compressed air 310 from the compressor to the inlet manifold of the engine. Engine exhaust 304 is expelled from the engine and is directed to the turbine through the exhaust gas outlet manifold 226. The downstream valve directs first turbine exhaust 306 from the turbine to the turbine-compressor device (e.g., operating as the hybrid turbine). The control valve directs second turbine exhaust 308 from the turbine-compressor device, to the outlet, and out of the turbine-compressor assembly.

The turbine-compressor assembly operating in the turbine mode of operation extracts energy from the engine exhaust and from the first turbine exhaust. For example, the hybrid turbine-compressor device extracts energy from the first turbine exhaust before the first turbine exhaust is directed to the outlet and out of the turbine-compressor assembly. Energy extracted from the first turbine exhaust generates power for the power device.

Figure 4:
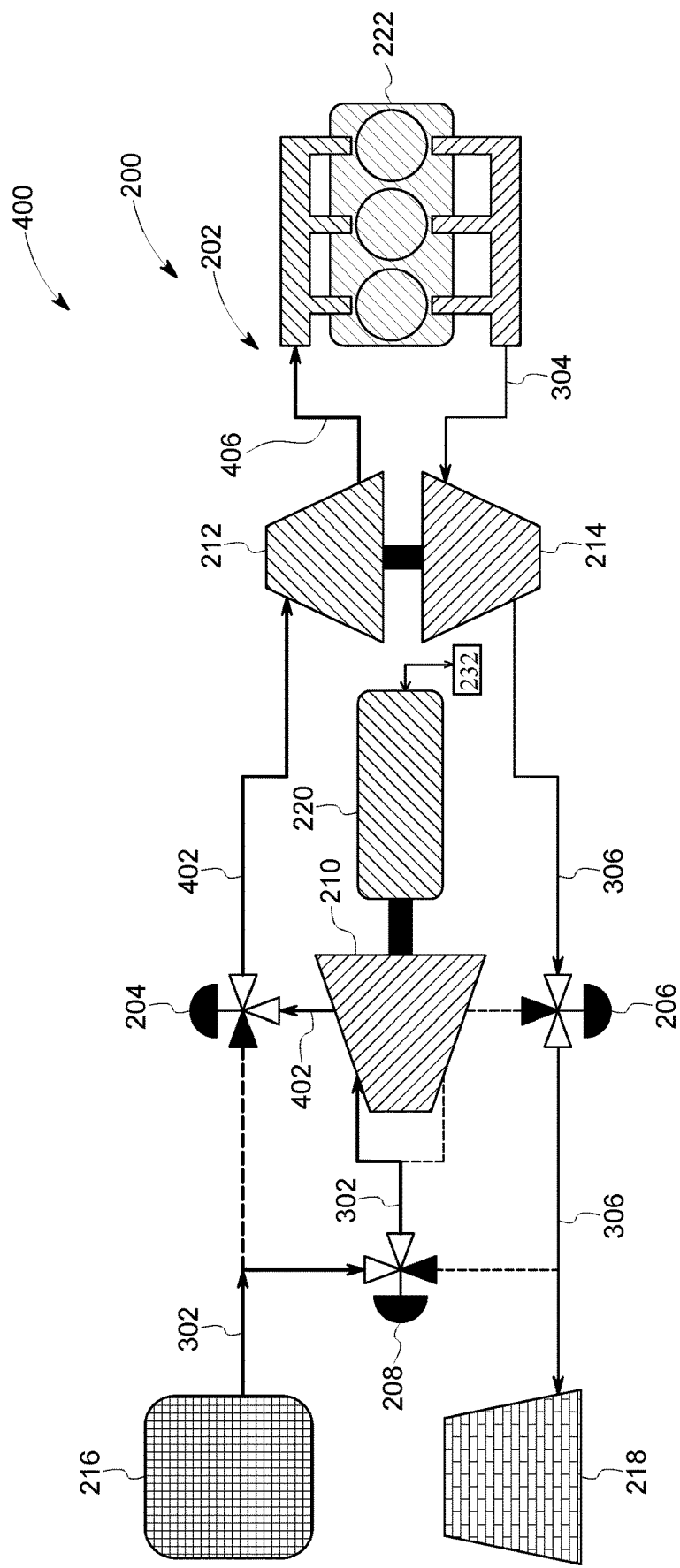
FIG. 4 illustrates one embodiment of the hybrid turbine-compressor assembly shown in FIG. 2 operating in a compressor mode of operation.

FIG. 4 illustrates one embodiment of the turbine-compressor assembly operating in the compressor mode of operation 400. While the turbine-compressor assembly operates in the compressor mode of operation, the turbine-compressor device operates as the hybrid compressor and the power device operates in the motor mode of operation and provides power from the storage device 232 or other power source to drive the turbine-compressor device. Inlet air is directed from the inlet to the control valve. The control valve directs the inlet air from the inlet to the turbine-compressor device (e.g., operating as the hybrid compressor) where the inlet air is compressed.

First compressed air 402 is expelled from the turbine-compressor device. The upstream valve directs the first compressed air from the turbine-compressor device to the compressor. The compressor compresses the first compressed air and directs second compressed air 406 to the inlet manifold of the engine. For example, the second compressed air has an air pressure that is greater than the air pressure of the first compressed air. Additionally, the air flow (e.g., air speed) of the second compressed air to the engine is greater than the air flow of the compressed air (of FIG. 3) to the engine. The engine exhaust is expelled from the engine and is directed to the turbine. The downstream valve directs the first turbine exhaust from the turbine to the outlet and out of the turbine-compressor assembly.

The turbine-compressor assembly operating in the compressor mode of operation (e.g., instead of operating in the turbine mode of operation 300) changes the air flow (e.g., speed, air delivery, pressure, or the like) to the engine. For example, the turbine-compressor assembly may operate in the compressor mode of operation 400 to increase the speed, pressure, or the like, of the air flow to the engine independent of the vehicle changing the engine speed, engine load, or the like, relative to the turbine-compressor assembly operating in the turbine mode of operation 300.

The turbine-compressor assembly may switch between operating in the turbine mode of operation 300 or the compressor mode of operation 400 based on one or more operating parameters of the vehicle system. The operating parameters may include, but are not limited to, the air-to-fuel ratio of the turbine engine, exhaust temperatures of the engine, exhaust temperatures of the turbine, the engine load, the engine load of each vehicle of a consist of plural vehicles, engine speed, fuel flow (e.g., pressure, fuel injection rate, fuel consumption rate, or the like), or the like. The turbine-compressor assembly may operate in the turbine mode of operation responsive to the vehicle and/or vehicle system operating at an operating parameter that has an operating parameter value that is greater than an operating parameter value threshold. Alternatively, the turbine-compressor may operate in the compressor mode of operation responsive to the vehicle and/or vehicle system 100 operating at an operating parameter that has an operating parameter value that is less than an operating parameter value threshold. The turbine-compressor assembly may switch between operating in the turbine mode of operation and the compressor mode of operation during transient operation of the reciprocating engine dictated by power demands of the vehicle. During transient operations of increased power or load to reduced power or load, the controller may direct the assembly to operate in the turbine mode of operation. During transient operations of reduced power or load to increased power or load, the controller may direct the assembly to operate in the compressor mode of operation.

Figure 5:
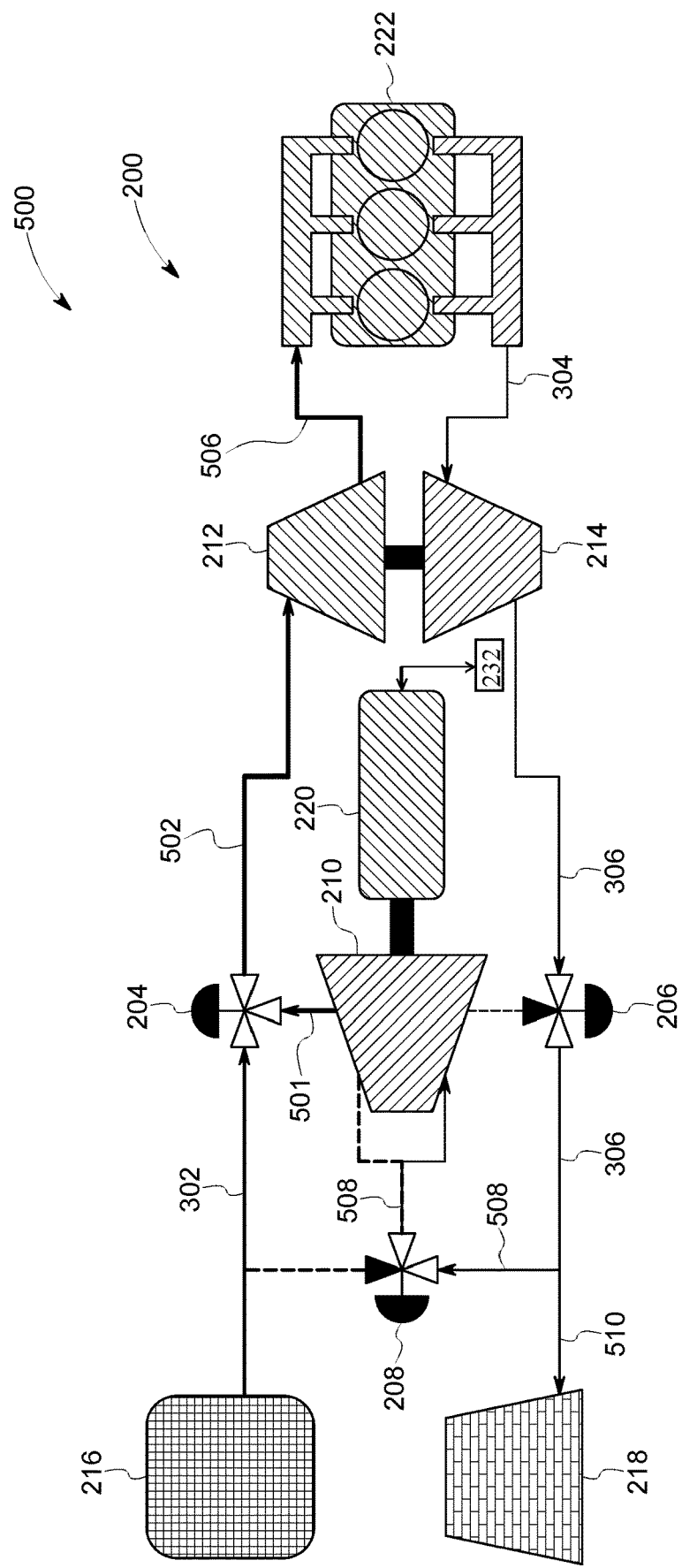
FIG. 5 illustrates one embodiment of the hybrid turbine-compressor assembly shown in FIG. 2 operating in a pump mode of operation.

In one or more embodiments, the turbine-compressor assembly may operate in an alternative mode of operation. For example, FIG. 5 illustrates one embodiment of the hybrid turbine-compressor assembly operating in a pump mode of operation 500. While the assembly operates in the pump mode of operation 500, the turbine-compressor device operates as a hybrid pump or an exhaust gas recirculation (EGR) pump. Additionally, the power device operates in the motor mode of operation and provides power to drive the hybrid device. The inlet air is directed from the inlet to the upstream valve. Additionally, the turbine-compressor device operating in the pump mode of operation 500 directs pump exhaust 501 to the upstream valve that is combined with the inlet air. The upstream valve directs a pump inlet air mixture 502 from the upstream valve to the compressor.

The engine exhaust is expelled from the turbine engine and is directed to the turbine, and first turbine exhaust is directed to the downstream valve. The control valve directs a first portion 508 of the first turbine exhaust to the turbine-compressor device and directs a second portion 510 of the first turbine exhaust to the outlet. For example, the first portion of the first turbine exhaust is directed to the turbine-compressor device (operating as the exhaust pump in the pump mode of operation), and directs the pump exhaust into the inlet air. The second portion of the first turbine exhaust is directed to the outlet. The first portion and the second portion may have common or unique volumes. In one embodiment, compressed gas may be routed to a pressure container such as a compressed air braking system.

Figure 6:
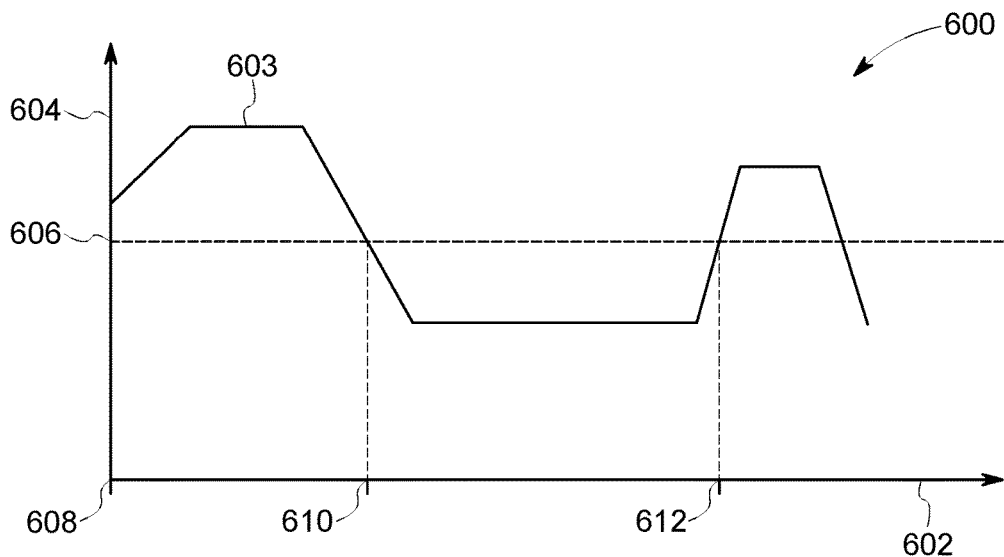
FIG. 6 illustrates one embodiment of a graph of a hybrid turbine-compressor assembly operating in a turbine mode of operation or a compressor mode of operation.

FIG. 6 illustrates one embodiment of a graph 600 of the turbine-compressor assembly operating in the turbine mode of operation 300 or the compressor mode of operation 400. The graph 600 includes a horizontal axis 602 representing increasing time as the vehicle moving along the route. A vertical axis 604 represents increasing operating parameter values. A line 603 indicates one example of a changing operating parameter value of the vehicle as the vehicle moves along the route. In one example, the operating parameter value 603 may represent the engine load of the vehicle as the vehicle moves along the route 114. Alternatively, the line 503 may indicate a different operating parameter of the vehicle, may indicate a combined operating parameter of plural vehicles of a consist of the vehicle system, or the like.

A horizontal threshold line 606 indicates an operating parameter value threshold. In the illustrated embodiment, the threshold line 606 indicating the operating parameter value threshold is substantially constant. Optionally, the threshold line 606 may vary as the vehicle moves along the route. As the vehicle moves along the route, the turbine-compressor assembly switches between operating in the turbine mode of operation or the compressor mode of operation based on the operating parameter (e.g., engine load) of the vehicle system. While the vehicle is operating at an operating parameter value that is greater than the horizontal threshold line 606 (e.g., the line 603 is above the threshold line 606), the turbine-compressor assembly operates in the turbine mode of operation. While the line 603 is below the threshold line 606 and the vehicle operates at an operating parameter value that is less than the horizontal threshold line 606, the turbine-compressor assembly operates in the compressor mode of operation.

As the vehicle moves along the route or track, the turbine-compressor assembly switches between operating in the turbine mode of operation or in the compressor mode of operation. From a first time 608 to a subsequent second time 610, the engine load is greater than the engine load threshold (e.g., the line 603 is above the threshold line 606) and the turbine-compressor assembly operates in the turbine mode of operation. For example, the turbine and the hybrid turbine-compressor device (e.g., operating as the hybrid turbine) may extract a sufficient amount of exhaust energy to produce a sufficient amount of compressed air pressure for the engine.

From the second time 610 to a subsequent third time 612, the vehicle operates with an engine load that is less than the engine load threshold (e.g., the line 603 is below the threshold line 606). For example, an insufficient amount of exhaust energy may be available to increase the engine combustion air pressure responsive to the assembly operating in the turbine mode of operation 300. In order to extract a sufficient amount of energy to produce a sufficient amount of air pressure for the engine, the turbine-compressor assembly switches from operating in the turbine mode of operation to operating in the compressor mode of operation. The one or more processors of the vehicle system may control the operation of the turbine-compressor device to change the direction of rotation of the wheel (e.g., the device fan) of the turbine-compressor device and change the position of each of the switches of the upstream valve, the downstream valve, and the control valve to change the flow of the fluid within the hybrid turbine-compressor assembly in order to operate the turbine-compressor device in the compressor mode of operation.

The assembly 200 operating in the compressor mode of operation compresses the air with the turbine-compressor device and the compressor. The compressor and the turbine-compressor device (e.g., operating as the hybrid compressor) may compress the air to provide a sufficient amount of compressed air pressure for the engine. For example, the turbine-compressor device (e.g., operating as the hybrid compressor) and the compressor increase the air pressure to a sufficient amount to increase the power output and to improve the efficiency of the engine operating at the engine loads that are less than the engine load threshold (e.g., the line threshold 606). The turbine-compressor assembly may switch from operating in the turbine mode of operation to operating in the compressor mode of operation (e.g., use the power device as the motor by extracting stored electric energy or power from the storage device 232 or other power source and use the turbine-compressor device as the hybrid compressor) to increase the air pressure of the compressed air to the engine while the vehicle is operating at a reduced or decreased load operating condition to enable increase power delivery to reach the power threshold 606.

The vehicle, the rail vehicle system, and/or one or more systems off-board the vehicle system may monitor (e.g., continuously, intermittently, or the like) the one or more operating parameters with the sensors onboard the vehicle or one or more sensors off-board the vehicle. Additionally, the one or more processors of the vehicle may change the operation of the assembly based on the one or more monitored operating parameters. In one or more embodiments, the one or more processors may automatically change the operation of the turbine-compressor assembly from one of the turbine operating mode or compressor operating mode to the other of the turbine or compressor operating modes. For example, the one or more processors may include software or software packages that direct the turbine-compressor assembly when to switch between operating in the turbine mode of operation or operating in the compressor mode of operation. Additionally or alternatively, an operator onboard or off-board the vehicle may manually change the operation of the turbine-compressor assembly via the input and/or output devices.

In one or more embodiments, the turbine-compressor assembly may switch between operating in the turbine mode of operation or in the compressor mode of operation if an air-to-fuel ratio is greater than or less than an air-to-fuel ratio value threshold. Optionally, the turbine-compressor assembly may switch between the different operating modes if a temperature of the engine exhaust is greater than or less than a temperature value threshold. Optionally, the turbine-compressor assembly may switch between the different operating modes if the flow rate of fuel to the engine is greater than or less than a flow rate value threshold. Optionally, the turbine-compressor assembly may switch between the different operating modes based on two or more different operating parameters. Optionally, the turbine-compressor may be bypassed so that no power is transferred to or from the motor generator.

Changing the operation of the turbine-compressor assembly increases the efficiency of the reciprocating engine relative to the turbine-compressor assembly not changing operations. For example, changing the turbine-compressor device from operating as the hybrid turbine or the hybrid compressor enables an increase of engine combustion air pressure at low engine loads. Increasing the engine combustion air pressure with the hybrid compressor reduces an amount of emissions the vehicle, the vehicle system, and/or the powered system may expel and improves the efficiency of the engine relative to the turbine engine not including the turbine-compressor device. Additionally or alternatively, the operation of the turbine-compressor assembly may be changed independent of changing the engine speed or engine load, for example by changing a notch setting of the propulsion system of the vehicle. For example, the assembly may increase engine combustion air pressure without concurrently changing the speed of the engine or the engine load.

Figure 7:
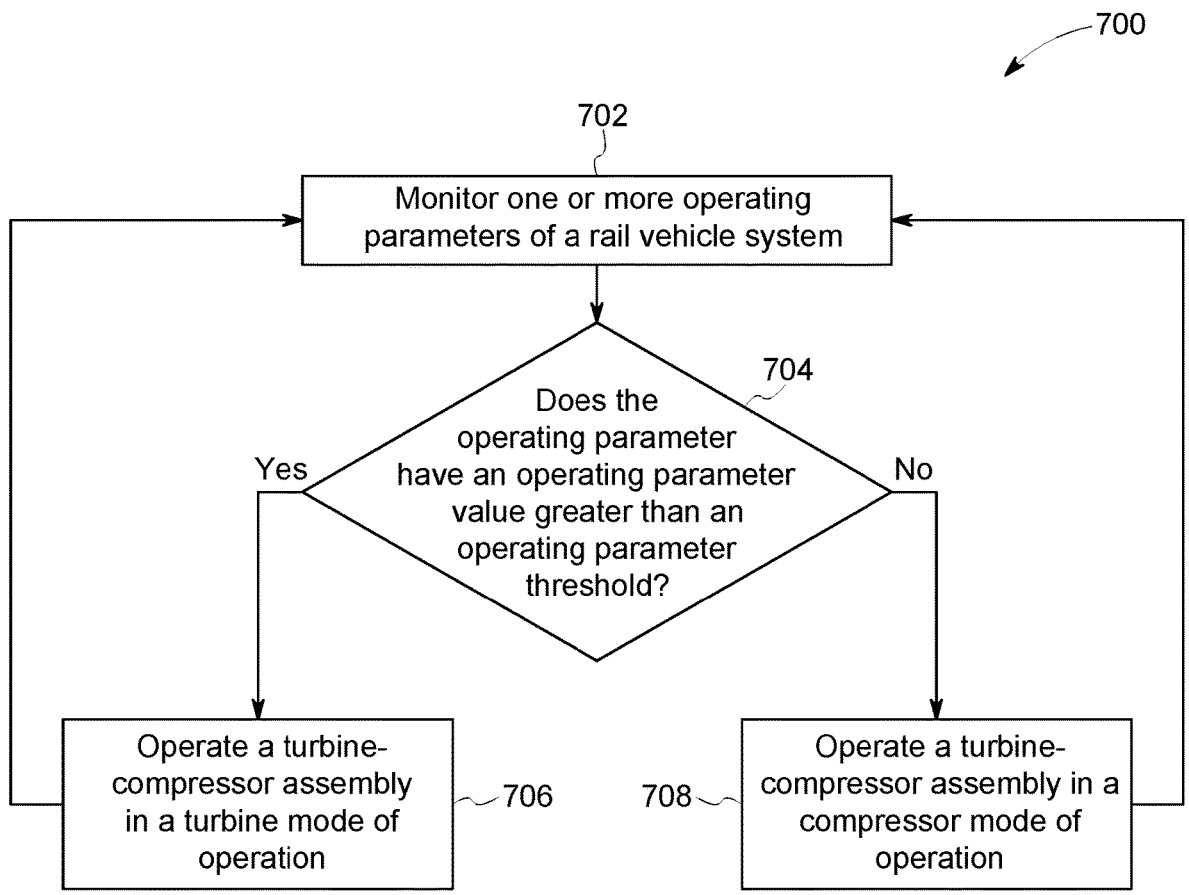
FIG. 7 is a flowchart of one embodiment of a method for controlling operation of a hybrid turbine-compressor assembly.

FIG. 7 illustrates a flowchart 700 of one embodiment of a method for controlling operation of the turbine-compressor assembly. At 702, as the vehicle moves along the route, the one or more processors monitor measurements of one or more operating parameters of the vehicle, the vehicle system, and/or the turbine-compressor assembly measured by the one or more sensors. For example, the sensors may measure the speed of the vehicle, identify the location of the vehicle and/or vehicle system, air-to-fuel ratio, exhaust temperatures, engine load, the rate of fuel flow, engine speed, or the like. Optionally, the system may be a stationary powered system, and the one or more processors may monitor measurements of the one or more operating parameters of the stationary powered system.

At 704, the one or more processors determine if the operating parameter has an operating parameter value that is greater than an operating parameter threshold. For example, the operating parameter may be engine load, air-to-fuel ratio of the engine, exhaust temperature, fuel flow, engine speed, or the like. If the operating parameter of vehicle has an operating parameter value that is greater than the operating parameter threshold, then flow of the method proceeds to 706. Alternatively, if the operating parameter of vehicle has an operating parameter value that is less than the operating parameter threshold, then flow of the method proceeds to 708. For example, if the engine load of the vehicle system is greater than an engine load threshold, then flow of the method proceeds 706. If the engine load is less than the engine load threshold, then flow of the method proceeds to 708.

At 706, the turbine-compressor assembly operates in the turbine mode of operation. For example, the one or more processors may change the direction of rotation of the wheel or fan of the turbine-compressor device to operate as the hybrid turbine that generates power for the power device operating in the generator mode of operation and adding electrical energy to the storage device 232 or another power consumption device. Additionally, the one or more processors change the position of each of the switches of the upstream valve, the downstream valve, and the control valve (e.g., as shown in FIG. 3) to change the flow of fluid within the turbine-compressor assembly in order to operate the turbine-compressor device in the turbine mode of operation. While the turbine-compressor assembly operates in the turbine mode of operation, the turbine and the turbine-compressor device extract energy from the engine exhaust. Flow of the method returns to 702 and the continues as the vehicle moves along the route.

Alternatively, at 708, the turbine-compressor assembly operates in the compressor mode of operation. For example, the one or more processors may change the direction of rotation of the fan or wheel of the turbine-compressor device to operate as the hybrid compressor that is driven by the power device operating in the motor mode of operation by extracting stored electrical energy from the storage device 232 or from another power source. Additionally, the one or more processors change the position of each of the switches of the upstream valve, the downstream valve, and the control valve (e.g., as shown in FIG. 4) to change the flow of fluid within the turbine-compressor assembly in order to operate the turbine-compressor device in the compressor mode of operation. While the turbine-compressor assembly operates in the compressor mode of operation, the compressor and the turbine-compressor device compress the inlet air that is directed to the engine. Flow of the method returns to 702 and the continues as the vehicle moves along the route.

In one or more embodiments, the turbine-compressor assembly may operate in the pump mode of operation. For example, the one or more processors may change the direction of rotation of the fan of the turbine-compressor device to operate as the hybrid pump that is driven by the power device. Additionally, the one or more processors may change the position of each of the switches of the upstream valve, the downstream valve, and the control valve (e.g., as shown in FIG. 5) to change the flow of fluid within the assembly in order to operate the turbine-compressor device in the pump mode of operation. While the assembly operates in the pump mode of operation, the control valve directs the first portion 508 of the first turbine exhaust to the turbine-compressor device that is pumped into and mixed with the inlet air, and the control valve directs the second portion 510 of the first turbine exhaust to the outlet 218.

In at least one embodiment, a turbine-compressor assembly of a system having an engine includes an upstream valve fluidly coupled with both a compressor and a turbine-compressor device, a downstream valve fluidly coupled with a turbine and the turbine-compressor device, and a controller configured to control the upstream valve, the downstream valve, and a control valve that is coupled with the upstream valve, the downstream valve, and the turbine-compressor device. The controller being further configured to selectively operate the turbine-compressor device in a plurality of operating modes In a turbine mode of operation, the upstream valve is controlled to direct inlet air to the compressor, the turbine is controlled to receive engine exhaust, the downstream valve is controlled to direct first turbine exhaust from the turbine to the turbine-compressor device, and the control valve is controlled to direct second turbine exhaust from the turbine-compressor device to an outlet of the system. In a compressor mode of operation, the control valve is controlled to direct the inlet air to the turbine-compressor device, the upstream valve is controlled to direct first compressed air from the turbine-compressor device to the compressor, and the downstream valve is controlled to direct the first turbine exhaust from the turbine to the outlet of the system.

Optionally, wherein, the plurality of operating modes further includes a pump mode of operation of the turbine-compressor device, in which the upstream valve is controlled to direct a pump inlet air mixture to the compressor, and the control valve is controlled to direct at least a portion of the first turbine exhaust to the turbine-compressor device and direct at least a portion of the first turbine exhaust to the outlet of the system.

Optionally, in the compressor mode of operation, the upstream valve is controlled to direct the first compressed air from the turbine-compressor device to the compressor, and the compressor is controlled to direct second compressed air from the compressor to the engine.

Optionally, the assembly also includes a power device coupled with the turbine-compressor device. The turbine-compressor device is configured to transfer torque to the power device to generate power while the turbine-compressor device is operating in the turbine mode of operation, and the power device is configured to consume power and transfer torque to the turbine-compressor device while the turbine-compressor device is operating in the compressor mode of operation.

Optionally, the power device operates in a generator mode of operation while the turbine-compressor device is operating in the turbine mode of operation, and the power device operates in a motor mode of operation while the turbine-compressor device is operating in the compressor mode of operation.

Optionally, the turbine-compressor device is configured to operate in the turbine mode of operation while the system is operating at a first operating parameter while an operating parameter value is greater than an operating parameter value threshold, and at a second operating parameter while the operating parameter value is less than the operating parameter value threshold.

Optionally, the turbine-compressor device is configured to operate in the compressor mode of operation while the system is operating at an engine speed that is lower than the operator parameter value threshold.

Optionally, in the compressor mode of operation, the outlet of the system is a pressure tank coupled to a compressed air system.

Optionally, the turbine-compressor device automatically switches between the turbine-compressor device operating in the turbine mode of operation or operating in the compressor mode of operation as the system travels along a route.

Optionally, the compressor is a radial compressor, and the turbine is a radial exhaust turbine.

In at least one embodiment, a method includes switching between operating a turbine-compressor assembly of a system at least in a turbine mode of operation and a compressor mode of operation. In the turbine mode of operation, directing inlet air to a compressor, receiving engine exhaust at a turbine, directing first turbine exhaust from the turbine to a turbine-compressor device, and directing second turbine exhaust from the turbine-compressor device to an outlet of the system. In the compressor mode of operation, directing the inlet air to the turbine-compressor device, directing first compressed air from the turbine-compressor device to the compressor, and directing the first turbine exhaust from the turbine to the outlet of the system.

Optionally, the method further comprises switching to a pump mode of operation, and in the pump mode of operation in which a pump inlet air mixture is directed to the compressor, and at least a portion of the first turbine exhaust is directed to the turbine-compressor device and at least a portion of the first turbine exhaust is directed to the outlet of the system.

Optionally, the method also includes directing the first compressed air from the turbine-compressor device to the compressor and directing second compressed air of the compressed air of the compressed air from the compressor to an engine while the turbine-compressor device is operating in the compressor mode of operation.

Optionally, the method also includes generating power with a power device coupled with the turbine-compressor device while the turbine-compressor device is operating in the turbine mode of operation.

Optionally, the method also includes consuming power with a power device coupled with the turbine-compressor device while the turbine-compressor device is operating in the compressor mode of operation.

Optionally, the method also includes operating the turbine-compressor device in the turbine mode of operation while the system is operating at an operating parameter having an operating parameter value that is greater than an operating parameter value threshold, and operating the turbine-compressor device in the compressor mode of operation while the system is operating at an operating parameter having an operating parameter value that is less than the operating parameter value threshold.

In at least one embodiment, a turbine-compressor assembly of a rail vehicle system having an engine includes a valving system coupled with a compressor, a turbine, and a turbine-compressor device, a power device coupled with the turbine-compressor device, and a controller configured to control the valving system to selectively switch between two or more operating modes of the turbine-compressor device. In a turbine mode of operation, the valve system is configured to direct inlet air to the compressor, the turbine being configured to receive engine exhaust, direct first turbine exhaust from the turbine to the turbine-compressor device, direct second turbine exhaust from the turbine-compressor device to an outlet of the rail vehicle system, and generate electrical power for the power device. In a compressor mode of operation, the valve system is configured to direct the inlet air to the turbine-compressor device, direct first compressed air from the turbine-compressor device to the compressor, direct the first turbine exhaust from the turbine to the outlet of the rail vehicle system, and the consume electrical power of the power device to compress the inlet air by the turbine-compressor device.

Optionally, the turbine-compressor device operates in a pump mode of operation, wherein the controller is configured to switch to the pump mode of operation to direct compressed air from the compressor.

Optionally, in the turbine mode of operation, an energy storage device is configured to store the generated electrical power.

Optionally, in the compressor mode of operation, the controller boosts performance of the compressor using the power device while a speed of the engine is below a threshold speed value.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A turbine-compressor assembly of a system having an engine, the turbine-compressor assembly comprising:
   an upstream valve configured to be fluidly coupled with both a compressor and a turbine-compressor device;
   a downstream valve configured to be fluidly coupled with both a turbine and the turbine-compressor device; and
   a controller configured to control the upstream valve, the downstream valve, and a control valve that is coupled with the upstream valve, the downstream valve, and the turbine-compressor device, the controller being further configured to selectively operate the turbine-compressor device in a plurality of operating modes; wherein
   in a turbine mode of operation, the upstream valve is controlled to direct inlet air to the compressor, the turbine is controlled to receive engine exhaust from the engine, the downstream valve is controlled to direct first turbine exhaust from the turbine to the turbine-compressor device, and the control valve is controlled to direct second turbine exhaust from the turbine-compressor device to an outlet of the system, and
   in a compressor mode of operation, the control valve is controlled to direct the inlet air to the turbine-compressor device, the upstream valve is controlled to direct first compressed air from the turbine-compressor device to the compressor, and the downstream valve is controlled to direct the first turbine exhaust from the turbine to the outlet of the system.

2. The turbine-compressor assembly of claim 1, wherein, the plurality of operating modes further includes a pump mode of operation of the turbine-compressor device, in which the upstream valve is controlled to direct a pump inlet air mixture to the compressor, and the control valve is controlled to direct at least a portion of the first turbine exhaust to the turbine-compressor device and direct at least a portion of the first turbine exhaust to the outlet of the system.

3. The turbine-compressor assembly of claim 1, wherein, in the compressor mode of operation, the upstream valve is controlled to direct the first compressed air from the turbine-compressor device to the compressor, and the compressor is controlled to direct second compressed air from the compressor to the engine.

4. The turbine-compressor assembly of claim 1, further comprising a power device coupled with the turbine-compressor device, wherein the turbine-compressor device is configured to transfer torque to the power device to generate power while the turbine-compressor device is operating in the turbine mode of operation, and the power device is configured to consume power and transfer torque to the turbine-compressor device while the turbine-compressor device is operating in the compressor mode of operation.

5. The turbine-compressor assembly of claim 4, wherein the power device operates in a generator mode of operation while the turbine-compressor device is operating in the turbine mode of operation, and wherein the power device operates in a motor mode of operation while the turbine-compressor device is operating in the compressor mode of operation.

6. The turbine-compressor assembly of claim 1, wherein the turbine-compressor device is configured to operate in the turbine mode of operation while the system is operating at a first operating parameter while an operating parameter value is greater than an operating parameter value threshold, and at a second operating parameter while the operating parameter value is less than the operating parameter value threshold.

7. The turbine-compressor assembly of claim 1, wherein the turbine-compressor device is configured to operate in the compressor mode of operation while the system is operating at an engine speed that is lower than the operator parameter value threshold.

8. The turbine-compressor assembly of claim 1, wherein in the compressor mode of operation, the outlet of the system is a pressure tank coupled to a compressed air system.

9. The turbine-compressor assembly of claim 1, wherein the turbine-compressor device is configured to automatically switch between the turbine-compressor device operating in the turbine mode of operation or operating in the compressor mode of operation as the system travels along a route based at least in part a location of the system on the route.

10. The turbine-compressor assembly of claim 1, wherein the compressor is a radial compressor, and wherein the turbine is a radial exhaust turbine.

11. A method comprising:
switching between operating a turbine-compressor assembly of a system at least in a turbine mode of operation and a compressor mode of operation, wherein,
in the turbine mode of operation, directing inlet air to a compressor, receiving engine exhaust at a turbine, directing first turbine exhaust from the turbine to a turbine-compressor device, and directing second turbine exhaust from the turbine-compressor device to an outlet of the system, and
in the compressor mode of operation, directing the inlet air to the turbine-compressor device, directing first compressed air from the turbine-compressor device to the compressor, and directing the first turbine exhaust from the turbine to the outlet of the system.

12. The method of claim 11, further comprising switching to a pump mode of operation, and in the pump mode of operation in which a pump inlet air mixture is directed to the compressor, and at least a portion of the first turbine exhaust is directed to the turbine-compressor device and at least a portion of the first turbine exhaust is directed to the outlet of the system.

13. The method of claim 11, further comprising directing the first compressed air from the turbine-compressor device to the compressor, and directing second compressed air of the compressed air from the compressor to an engine while the turbine-compressor device is operating in the compressor mode of operation.

14. The method of claim 11, further comprising generating power with a power device coupled with the turbine-compressor device while the turbine-compressor device is operating in the turbine mode of operation.

15. The method of claim 14, further comprising consuming power with a power device coupled with the turbine-compressor device while the turbine-compressor device is operating in the compressor mode of operation.

16. The method of claim 11, further comprising operating in the turbine-compressor device in the turbine mode of operation while the system is operating at an operating parameter having an operating parameter value that is greater than an operating parameter value threshold, and operating the turbine-compressor device in the compressor mode of operation while the system is operating at an operating parameter having an operating parameter value that is less than the operating parameter value threshold.

17. A turbine-compressor assembly of a vehicle system having an engine, the turbine-compressor assembly comprising:
a valving system coupled with a compressor, a turbine, and a turbine-compressor device;
a power device coupled with the turbine-compressor device; and
a controller configured to control the valving system to selectively switch between two or more operating modes of the turbine-compressor device,
wherein, in a turbine mode of operation, the valving system is configured to direct inlet air to the compressor and the turbine is configured to receive engine exhaust, direct first turbine exhaust from the turbine to the turbine-compressor device, and direct second turbine exhaust from the turbine-compressor device to an outlet of the vehicle system, wherein the turbine-compressor device is configured to generate electrical power for the power device, and
wherein, in a compressor mode of operation, the valving system is configured to direct the inlet air to the turbine-compressor device, direct first compressed air from the turbine-compressor device to the compressor, and direct the first turbine exhaust from the turbine to the outlet of the vehicle system, wherein the turbine-compressor device is configured to consume electrical power from the power device to compress the inlet air.

18. The turbine-compressor assembly of claim 17, wherein the turbine-compressor device is configured to operate in a pump mode of operation, wherein the controller is configured to switch to the pump mode of operation to direct compressed air from the compressor.

19. The turbine-compressor assembly of claim 17, wherein, in the turbine mode of operation, an energy storage device is configured to store the generated electrical power.

20. The turbine-compressor assembly of claim 17, wherein, in the compressor mode of operation, the controller is configured to boost performance of the compressor using the power device while a speed of the engine is below a threshold speed value.

* * * * *